(No Model.)

F. W. THAYER & A. S. HOWELL.
JOURNAL BEARING.

No. 314,079. Patented Mar. 17, 1885.

WITNESSES:
A. G. Morey.

INVENTORS
Frank W. Thayer
BY Allen S. Howell
G. L. Chapin.
ATTORNEY

UNITED STATES PATENT OFFICE.

FRANK W. THAYER AND ALLEN S. HOWELL, OF MILWAUKEE, WISCONSIN.

JOURNAL-BEARING.

SPECIFICATION forming part of Letters Patent No. 314,079, dated March 17, 1885.

Application filed November 6, 1884. (No model.)

*To all whom it may concern:*

Be it known that we, FRANK W. THAYER and ALLEN S. HOWELL, of Milwaukee, in the county of Milwaukee and State of Wisconsin, citizens of the United States, have invented new and useful Improvements in Journal-Bearings, of which the following is a specification, reference being had to accompanying drawings, in which—

Figure 1:
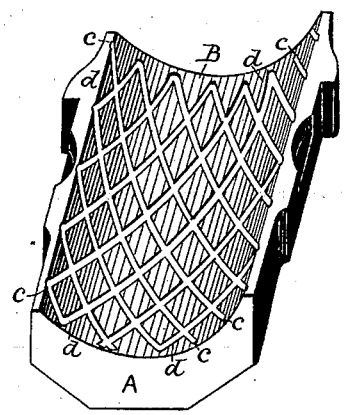
Figure 2:
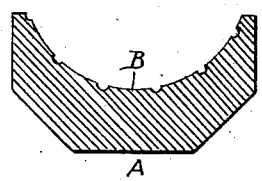

Figure 1 is a perspective view of an inverted journal-bearing embodying our improvements. Fig. 2 is a transverse section thereof.

The purpose of the present invention is to provide a car-journal bearing which, where placed on the journal and inside of the ordinary oil-box, will take the oil at the side edges of the bearing and carry it over the top of the journal, where the lubricating is to be done. A better understanding of the application will be had by setting forth that on car-journals only the top journal-bearing is employed to support the weight of the car, and that portion of the journal which is to be lubricated runs in an oil-box.

The nature of the invention consists in diagonal grooves, which are formed in the semicircular portion of the bearing and across each other. These grooves form notches in the inner margins of the radial or flat portions of the metal adjoining the circular part, whereby oil enters the grooves and flows by the movement of the journal over the bearing-surface of the parts. In contradistinction, the state of the art shows that journal-bearings have been formed with diagonal grooves in a portion of the circular bearing part, but leaving margins in the circular bearing part surrounding the diagonal grooves at the ends and sides of the said circular bearing part, leaving no grooved means for the oil to enter the bearing from an external oil-receptacle.

It has been the custom heretofore to use plain metal half-bearings without grooves for car-journals; but, as a matter of setting forth utility, it is stated that our improved bearing has been substituted on several of the railroads in the West for the ordinary bearing, and a "hot-box" is almost unknown where our improvement is used. The box is preferably made of brass, and in its semicircular bearing-surface B are formed two sets of diagonal grooves, *c d*, which open into each other at their intersections and are made three-sixteenths of an inch deep, radial measurement, whereby the flat or radial portions of the box are notched by the grooves to admit oil from an exterior oil cup or box freely to all parts of said bearing-surface. These grooves are not cut through the ends of the circular part, as such construction is immaterial, provided the bearing-surface takes oil from the grooves which are notched into the radial flat parts, as shown.

We claim as our invention—

A journal-bearing for car-axles, made of brass or other suitable material, and formed with diagonal grooves *c d*, which open into each other at their intersection and open through the radial flat portion of the box to form oil-inlets, as specified.

FRANK W. THAYER.
ALLEN S. HOWELL.

Witnesses:
A. G. MOREY,
G. L. CHAPIN.